US012693582B2

(12) United States Patent
Li

(10) Patent No.: US 12,693,582 B2
(45) Date of Patent: Jul. 28, 2026

(54) ROTATING MODULE AND GIMBAL

(71) Applicant: Shenzhen JX ROBOT Technology Co., Ltd, Shenzhen (CN)

(72) Inventor: Hailong Li, Shenzhen (CN)

(73) Assignee: Shenzhen JX ROBOT Technology Co., Ltd, Shenzhen (CN)

( * ) Notice: Subject to any disclaimer, the term of this patent is extended or adjusted under 35 U.S.C. 154(b) by 288 days.

(21) Appl. No.: 18/650,087

(22) Filed: Apr. 30, 2024

(65) Prior Publication Data

US 2025/0208490 A1      Jun. 26, 2025

(30) Foreign Application Priority Data

Dec. 22, 2023      (CN) .......................... 202311787406.4

(51) Int. Cl.
*G03B 17/56*          (2021.01)
*H02K 5/22*           (2006.01)

(52) U.S. Cl.
CPC ........... *G03B 17/561* (2013.01); *H02K 5/225* (2013.01); *H02K 2211/03* (2013.01)

(58) Field of Classification Search
CPC .... F16M 11/18; F16M 11/10; F16M 11/2042; F16M 2200/044; F16M 11/041; F16M 2200/041; F16M 11/105; F16M 11/123;

F16M 11/205; F16M 11/2071; F16M 13/00; G03B 17/561; G03B 17/563; H02K 5/225; H02K 2211/03; H02K 11/33
See application file for complete search history.

(56) References Cited

FOREIGN PATENT DOCUMENTS

| CN | 214434628 U | * | 10/2021 | |
| CN | 114517873 A | * | 5/2022 | ............. B08B 17/04 |
| CN | 219867196 U | * | 10/2023 | |
| WO | WO-2022041575 A1 | * | 3/2022 | ............. F16M 11/08 |
| WO | WO-2022141245 A1 | * | 7/2022 | ........... F16M 11/121 |

* cited by examiner

*Primary Examiner* — Curtis A Kuntz

(57) ABSTRACT

The present invention relates to the technical field of photographing equipment, and in particular to a rotating module and a gimbal. The rotating module includes a first housing, a second housing, a first motor assembly, a conductive post, a conductive assembly, a first driving circuit board and a control assembly. The first motor assembly includes a first stator and a first rotor, the first stator is provided in the first housing, and the rotor is fixedly sleeved on the second hollow shaft. The conductive assembly includes a first conductive terminal and a second conductive terminal provided in the second housing, respectively corresponding to and being in contact with the first conducting part and the second conducting part. The first driving circuit board is connected to the first conductive terminal, the second conductive terminal and the first motor assembly respectively.

18 Claims, 6 Drawing Sheets

ROTATING MODULE AND GIMBAL

CROSS REFERENCE TO RELATED APPLICATIONS

The present claims the benefit of Chinese Patent Application No. 202311787406.4 filed on Dec. 22, 2023, the contents of which are incorporated herein by reference in their entirety.

TECHNICAL FIELD

The present invention relates to the technical field of photographing equipment, in particular to a rotating module and a gimbal.

BACKGROUND TECHNIQUE

With the continuous development of gimbals, users' photography skills with gimbals have also gradually improved. The gimbal includes multiple motors, and the rotation and control of each motor requires electrical connection through wires. At present, the wires of the gimbal are inserted through the middle through hole of the motor shaft, preventing the gimbal motor from performing unlimited rotation to avoid potential wire twisting or short circuits due to excessive rotation angles. Currently, gimbal motors add mechanical limits to prevent damage to wires. However, the addition of the mechanical limit limits the rotation of the gimbal motor, which in turn limits the rotation angle and application scenarios of the gimbal.

Contents of the Invention

The technical problem to be solved by the embodiments of the present invention is to provide a rotating module and a gimbal that can enable at least one motor of the gimbal to rotate without limitation, thereby improving the limited rotation angle and application scenarios of the gimbal.

The present invention discloses a rotating module, including:
- a first housing, a first hollow shaft being provided at an end of the first housing;
- a second housing, a second hollow shaft being provided at an end of the second housing close to the first housing, the first hollow shaft being inserted into the second hollow shaft, and the first hollow shaft and the second hollow shaft being rotationally connected;
- a first motor assembly including a first stator and a first rotor, the first stator being fixedly provided in the first housing, and the first rotor being fixedly sleeved on the second hollow shaft;
- a conductive post inserted into the first hollow shaft, the conductive post including a first conductive part and a second conductive part that are insulated from each other;
- a conductive assembly including a first conductive terminal and a second conductive terminal provided in the second housing, the first conductive terminal being in contact with the first conductive part, and the second conductive terminal being in contact with the second conductive part;
- a first driving circuit board provided in the second housing and connected to the first conductive terminal and the second conductive terminal respectively, the first driving circuit board being further connected to the first rotor; and

- a control assembly provided in the first housing and connected to the first conductive part and the second conductive part respectively.

Optionally, the conductive post further includes a third conductive part;
- the conductive assembly further includes a third conductive terminal provided in the second housing;
- the third conductive part is insulated from the first conductive part and the second conductive part respectively;
- an end of the third conductive terminal is in contact with the third conductive part, and another end is connected to the first driving circuit board; and
- the third conductive part is further connected to the control assembly.

Optionally, the first housing is further formed with a first accommodation space and an installation space, the first stator is located in the first accommodation space, and the control assembly is located in the installation space;
- the second housing is further formed with a second accommodation space, the conductive assembly is located in the second accommodation space, and an end of the conductive post is located in the second accommodation space;
- a limiting member is provided on an end of the first hollow shaft located in the second accommodation space, and a side of the limiting member facing the first housing abuts the second hollow shaft;
- the conductive assembly further includes a fourth conductive terminal, the fourth conductive terminal is in contact with the limiting member or the first hollow shaft, the first driving circuit board is connected to the fourth conductive terminal, and the first hollow shaft is further connected to the control assembly; and
- wherein the limiting member and the first hollow shaft are made of a conductive material, and the third conductive part is insulated from the limiting member and the first hollow shaft respectively.

Optionally, the second conductive terminal is in elastic contact with the second conductive part, the third conductive terminal is in elastic contact with the third conductive part is in elastic contact, and the fourth conductive terminal is in elastic contact with the limiting member.

Optionally, the conductive post sequentially includes the first conductive part, a first insulating layer, the second conductive part, a second insulating layer, the third conductive part and a third insulating layer which are sleeved one by one along a radial direction from a center toward a periphery;
- at an end of the conductive post located in the second accommodation space, the first insulating layer is formed with a first flange along a radial direction of the conductive post, and the second insulating layer is formed with a second flange along the radial direction of the conductive post, and the third insulating layer is formed with a third flange along the radial direction of the conductive post;
- along an axial direction of the conductive post, an exposed portion of the second conductive part is located between the first flange and the second flange, and an exposed portion of the third conductive part is located between the second flange and the third flange.

Optionally, the first hollow shaft is sleeved with a first bearing and a second bearing, and the first bearing and the second bearing are used to connect the first hollow shaft and the second hollow shaft;

the limiting member includes a first connecting part and a second connecting part that are connected, and the first connecting part is sleeved on the first hollow shaft and in contact with an inner ring of the first bearing, the third flange is provided on the limiting member, and the first conductive terminal abuts between the first conductive part and the first driving circuit board.

Optionally, at least one of the first conductive terminal, the second conductive terminal, the third conductive terminal and the fourth conductive terminal is provided in multiple quantities.

Optionally, the rotating module further includes:

a third housing rotationally connected to the second housing;

a second motor assembly including a second stator and a second rotor that are rotationally connected, the second stator is fixedly provided on the second housing, and the second rotor is connected to the third housing;

a second driving circuit board provided on the second housing or the third housing, the second driving circuit board is connected to the first driving circuit board and the second rotor.

Optionally, the rotating module further includes:

a clamping assembly rotationally connected to the third housing;

a third motor assembly including a third stator and a third rotor that are rotationally connected, the third stator is fixedly provided on the third housing, and the third rotor is connected to the clamping assembly;

a third driving circuit board provided on the third housing or the clamping assembly, the third driving circuit board is connected to the second driving circuit board and the third rotor.

The present invention further discloses a gimbal including the above rotating module.

Compared with the prior art, the beneficial effects of the rotating module and the gimbal provided by the embodiments of the present invention are that:

an end of the first housing is provided with a first hollow shaft, an end of the second housing close to the first housing is provided with a second hollow shaft, and the first hollow shaft is inserted into the second hollow shaft; the first stator of the first motor assembly is fixed in the first housing, and the first rotor of the first motor assembly is fixedly sleeved in the second hollow shaft; the first stator is fixedly mounted on the first housing, and the rotation of the first rotor drives the movement of the second housing to achieve the purpose of rotation of the second housing on the first housing; meanwhile, a conductive post is inserted into the first hollow shaft, and both ends of the conductive post are connected to the conductive assembly and the control assembly respectively. The specific connection method is that the conductive post includes a first conductive part and a second conductive part that are insulated from each other, and the conductive assembly includes a first conductive terminal and a second conductive terminal in the second housing, wherein the first conductive terminal is in contact with the first conductive part, and the second conductive terminal is in contact with the second conductive part; when the second housing rotates on the first housing, the conductive assembly moves together with the first housing, the contact relationship between the conductive assembly and the conductive post can maintain a good connection state during the movement of the conductive assembly around the conductive post. The above connection relationship replaces the traditional wire connection between the first driving circuit board and the control assembly, and thus at least one motor of the rotating module and the gimbal of the present application can rotate without limitation, so that the rotation angle and application scenarios of the gimbal for shooting are not limited.

DESCRIPTION OF THE DRAWINGS

The technical solution of the present invention will be further described in detail below with reference to the accompanying drawings and embodiments. In the accompanying drawings.

Figure 1:
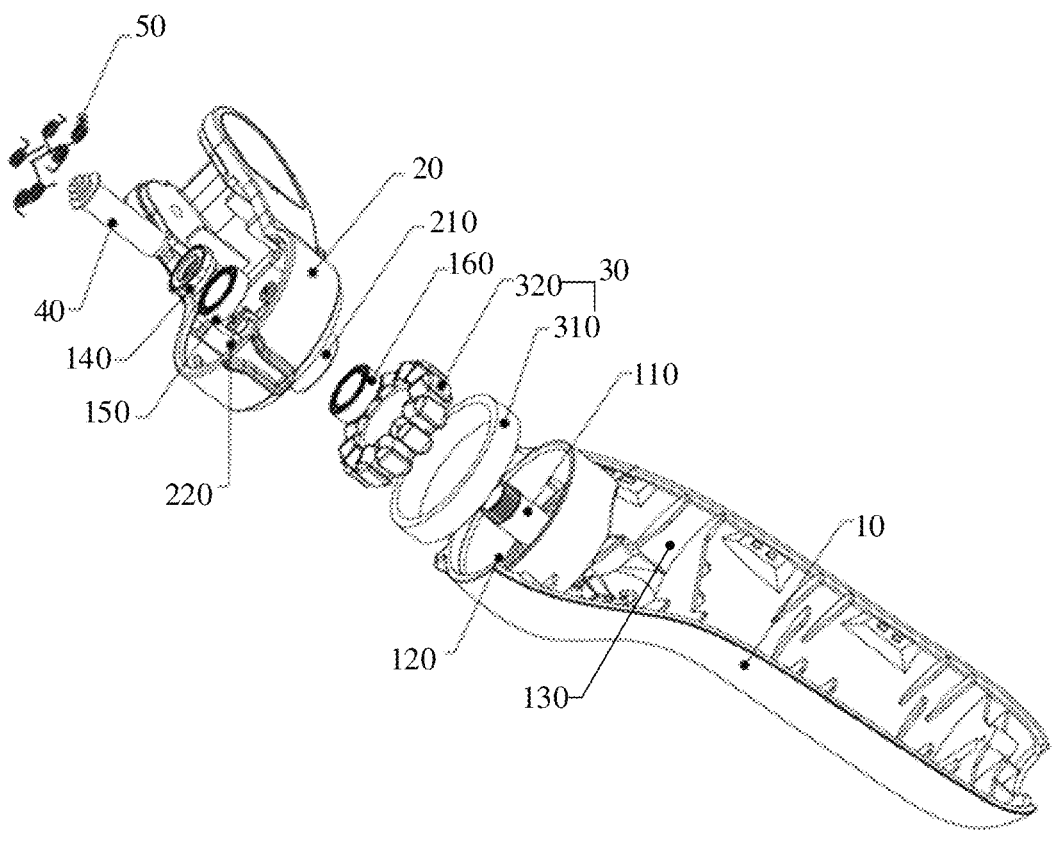
FIG. 1 is an exploded view of a rotating module provided by an embodiment of the present invention.
Figure 2:
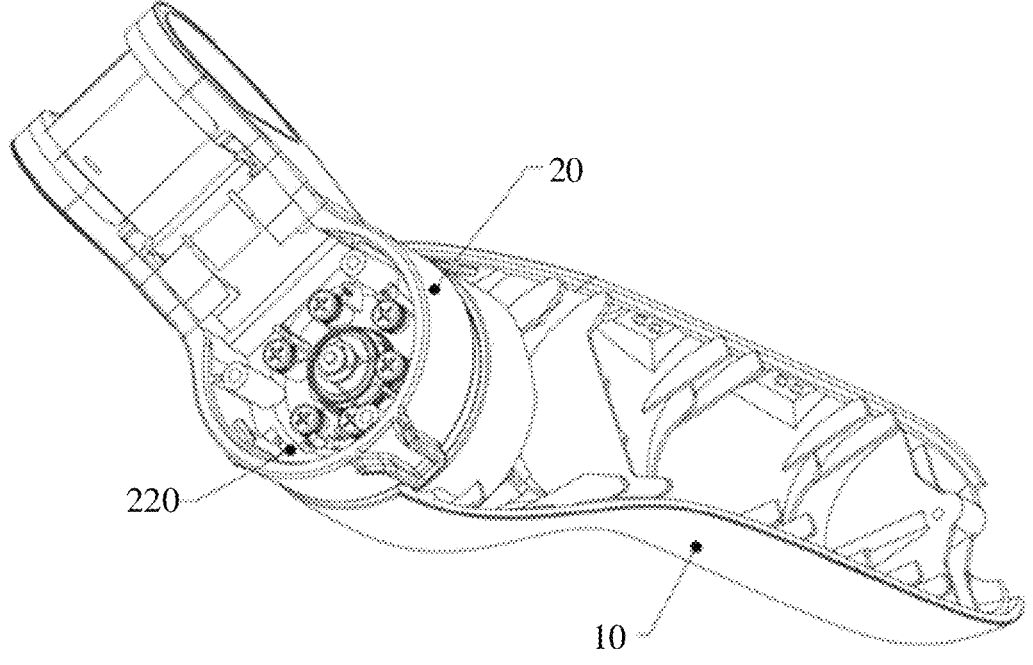
FIG. 2 is a schematic view of the overall structure of a rotating module provided by an embodiment of the present invention.

Each reference number in the drawings is:

10. First housing; 110. First hollow shaft; 120. First accommodation space; 140. Limiting member; 141. First connecting part; 142. Second connecting part; 150. First bearing; 160. Second bearing;

20. Second housing; 210. Second hollow shaft; 220. Second accommodation space;

30. First motor assembly; 310. First stator; 320. First rotor;

40. Conductive post; 410. First conductive part; 420. Second conductive part; 430. Third conductive part; 440. First insulating layer; 441. First flange; 450. Second insulating layer; 451. Second flange; 460. Third insulating layer; 461. Third flange;

50. Conductive assembly; 510. First conductive terminal; 520. Second conductive terminal; 530. Third conductive terminal; 540. Fourth conductive terminal; 521. Second mounting part; 531. Third mounting part; 541. Fourth mounting part; 5211. Second fixing part; 5311. Third fixing part; 5411. Fourth fixing part;

130. Installation space;

60. First driving circuit board;

70. Third housing;

80. Clamping assembly.

DETAILED DESCRIPTION

It should be noted that, as long as there is no conflict, the embodiments and features in the embodiments of this application can be combined with each other. The preferred embodiments of the present invention will now be described in detail with reference to the accompanying drawings.

An embodiment of the present invention provides a rotating module, as shown in FIGS. 1 to 7, including: a first housing 10, a second housing 20, a first motor assembly 30, a conductive post 40, a conductive assembly 50, a first driving circuit board 60 and a control assembly. A first hollow shaft 110 is provided at one end of the first housing 10; a second hollow shaft 210 is provided at one end of the second housing 20 close to the first housing 10; the first hollow shaft 110 is inserted into the second hollow shaft 210; and the first hollow shaft 110 and the second hollow shaft 210 are rotationally connected. The first motor assembly 30 includes a first stator 310 and a first rotor 320, the first stator 310 is fixedly provided in the first housing 10, and the first rotor 320 is fixedly sleeved on the second hollow shaft 210. The conductive post 40 is inserted into the first hollow shaft 110, and both ends extend out from the first hollow shaft 110. The conductive post 40 includes a first conductive part 410 and a second conductive part 420 that are insulated from each other. The conductive assembly 50 includes a first conductive terminal 510 and a second conductive terminal 520 provided in the second housing 20, the first conductive terminal 510 is in contact with the first conductive part 410 and the second conductive terminal 520 is in contact with the second conductive part 420. The first driving circuit board 60 is provided in the second housing 20 and connected to the first conductive terminal 510 and the second conductive terminal 520 respectively. The first driving circuit board 60 is connected to the first rotor 320; a control assembly (not shown in the drawings) is provided in the first housing 10, and the control assembly is connected to the first conductive part 410 and the second conductive part 420.

In this embodiment, one end of the first housing 10 of the rotating module is provided with a first hollow shaft 110, one end of the second housing 20 close to the first housing 10 is provided with a second hollow shaft 210, and the first hollow shaft 110 is inserted into in the second hollow shaft 210. The first stator 310 of the first motor assembly 30 is fixed in the first housing 10, and the first rotor 320 of the first motor assembly 30 is fixedly sleeved on the second hollow shaft 210. The first stator 310 is fixedly mounted on the first housing 10. The rotation of the first rotor 320 drives the movement of the second housing 20 to realize the purpose of rotation of the second housing 20 on the first housing 10; meanwhile, the conductive post 40 is inserted into the first hollow shaft 110; both ends of the conductive post 40 extend out from the first hollow shaft 110; and two ends of the conductive post 40 are connected to the conductive assembly 50 and the control assembly respectively. The specific connection method is: the conductive post 40 includes a first conductive part 410 and a second conductive part 420 that are insulated from each other. The conductive assembly 50 includes a first conductive terminal 510 and a second conductive terminal 520 provided in the second housing 20, wherein the first conductive terminal 510 is in contact with the first conductive part 410, and the second conductive terminal 520 is in contact with the second conductive part 420. When the second housing 20 rotates on the first housing 10, the conductive assembly 50 moves together with the first housing 10, the above contact relationship between the conductive assembly 50 and the conductive post 40 can maintain a good connection state during the movement of the conductive assembly 50 around the conductive post 40. The above method replaces the traditional wire connection between the first driving circuit board 60 and the control assembly. Therefore, at least one motor of the rotating module and the gimbal of the present application can rotate without limitation, so that the rotation angle and application scenarios of the gimbal for shooting are not limited.

During use of the above conductive post 40, the first conductive part 410 and the second conductive part 420 are used to connect the control assembly and the first driving circuit board 60, wherein the control assembly includes a signal module and a power module, and the connection relationship of the conductive post 40 and the control assembly is as follows: the first conductive part 410 and the second conductive part 420 are respectively connected to the positive and negative poles of the power module, and the signal module and the first driving circuit board 60 are controlled wirelessly. The first conductive part 410 and the second conductive part 420 are both connected to the first driving circuit board 60. The above signal module can send a first control signal. The first control signal is wirelessly transmitted to the first driving circuit board 60. The first driving circuit board 60 is connected to the first rotor 320 to achieve the movement of the first rotor 320, thereby driving the second housing 20 to rotate on the first housing 10. The above control assembly and the first driving circuit board 60 are implemented using existing technologies, and their implementation principles will not be described in detail here.

Figure 5:
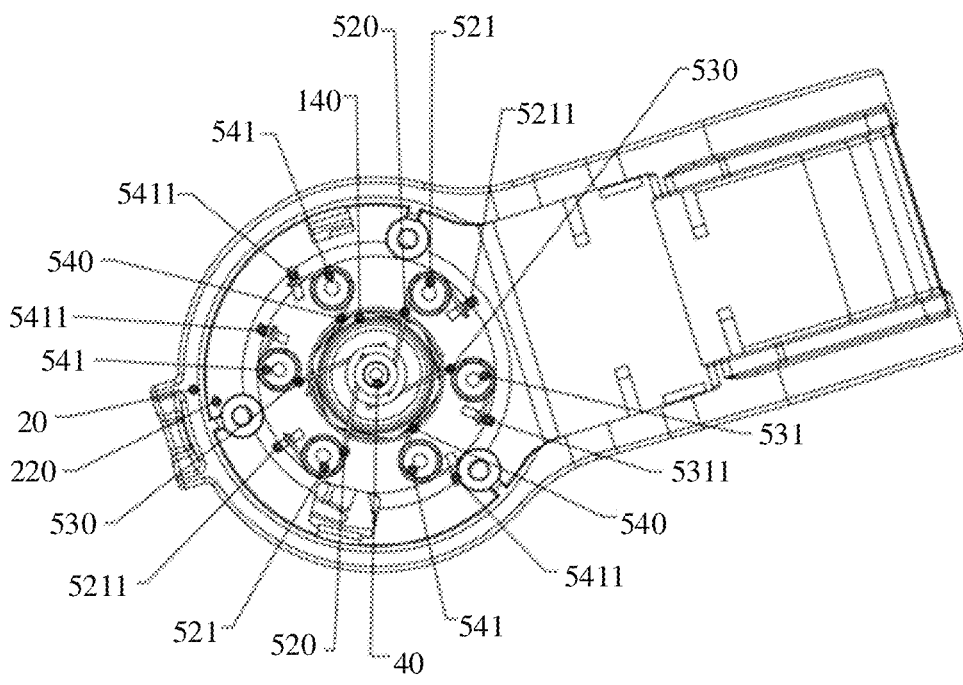
FIG. 5 is a top view of a second housing provided by an embodiment of the present invention.
Figure 6:
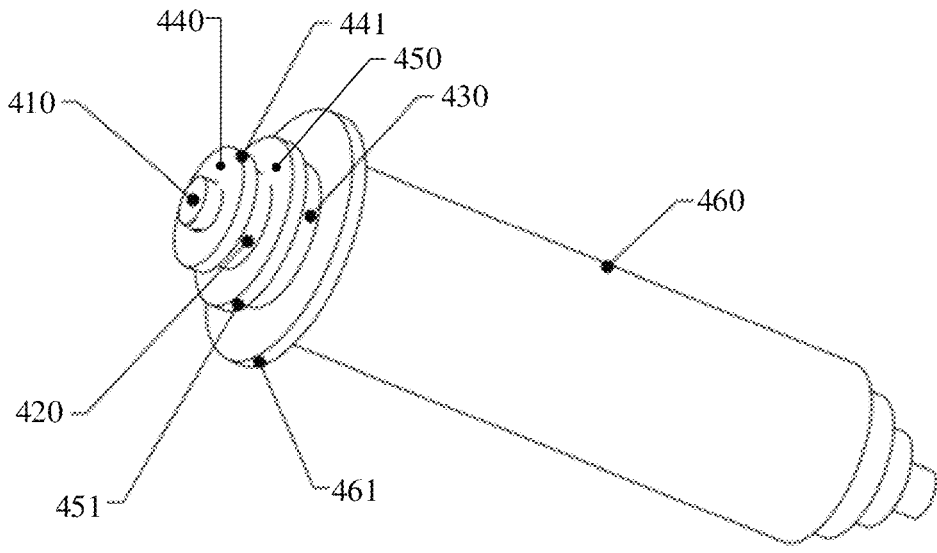
FIG. 6 is a structural schematic view of a conductive post provided by an embodiment of the present invention.
Figure 7:
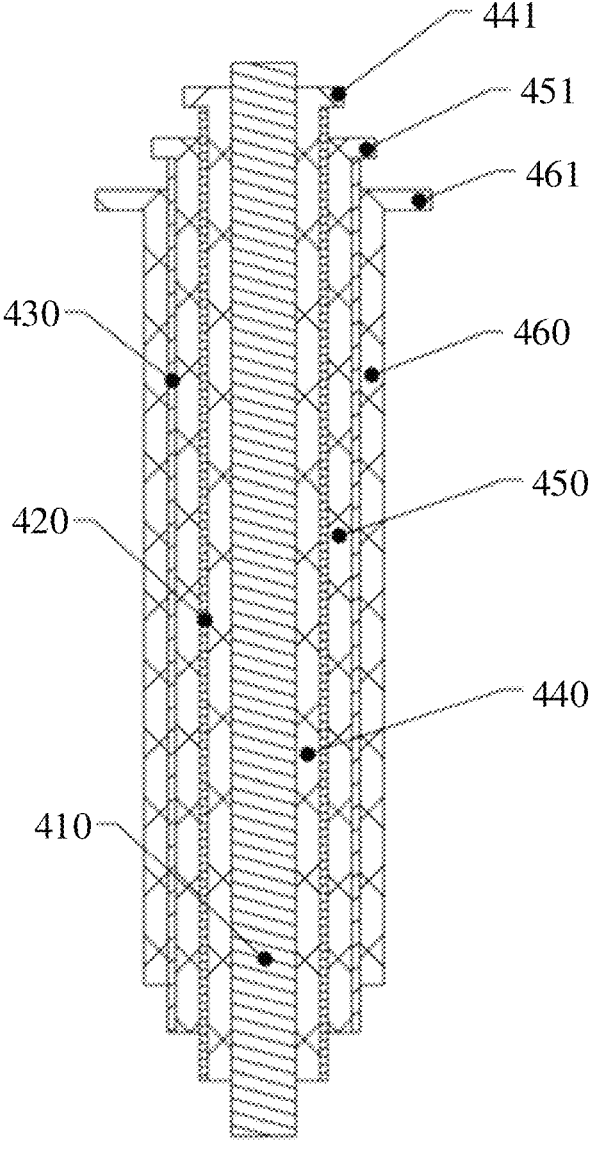
FIG. 7 is a cross-sectional view of a conductive post provided by an embodiment of the present invention.

As a preferred solution of this embodiment, please refer to FIGS. 5 to 7. The conductive post 40 further includes a third conductive part 430, and the conductive assembly 50 further includes a third conductive terminal 530 provided in the second housing 20. The third conductive part 430 is respectively insulated from the first conductive part 410 and the second conductive part 420. One end of the third conductive terminal 530 is in contact with the third conductive part 430, and the other end is connected to the first driving circuit board 60. The third conductive part 430 is also connected to the control assembly.

The above third conductive part 430 is used to connect the signal module of the control assembly and the third conductive terminal 530, and the third conductive terminal 530 is used to connect the third conductive part 430 and the first driving circuit board 60, ultimately achieving that the first control signal sent by the signal module is transmitted to the first driving circuit board 60 through the third conductive part 430 and the third conductive terminal 530 to achieve the purpose of controlling the first motor assembly 30.

Figure 3:
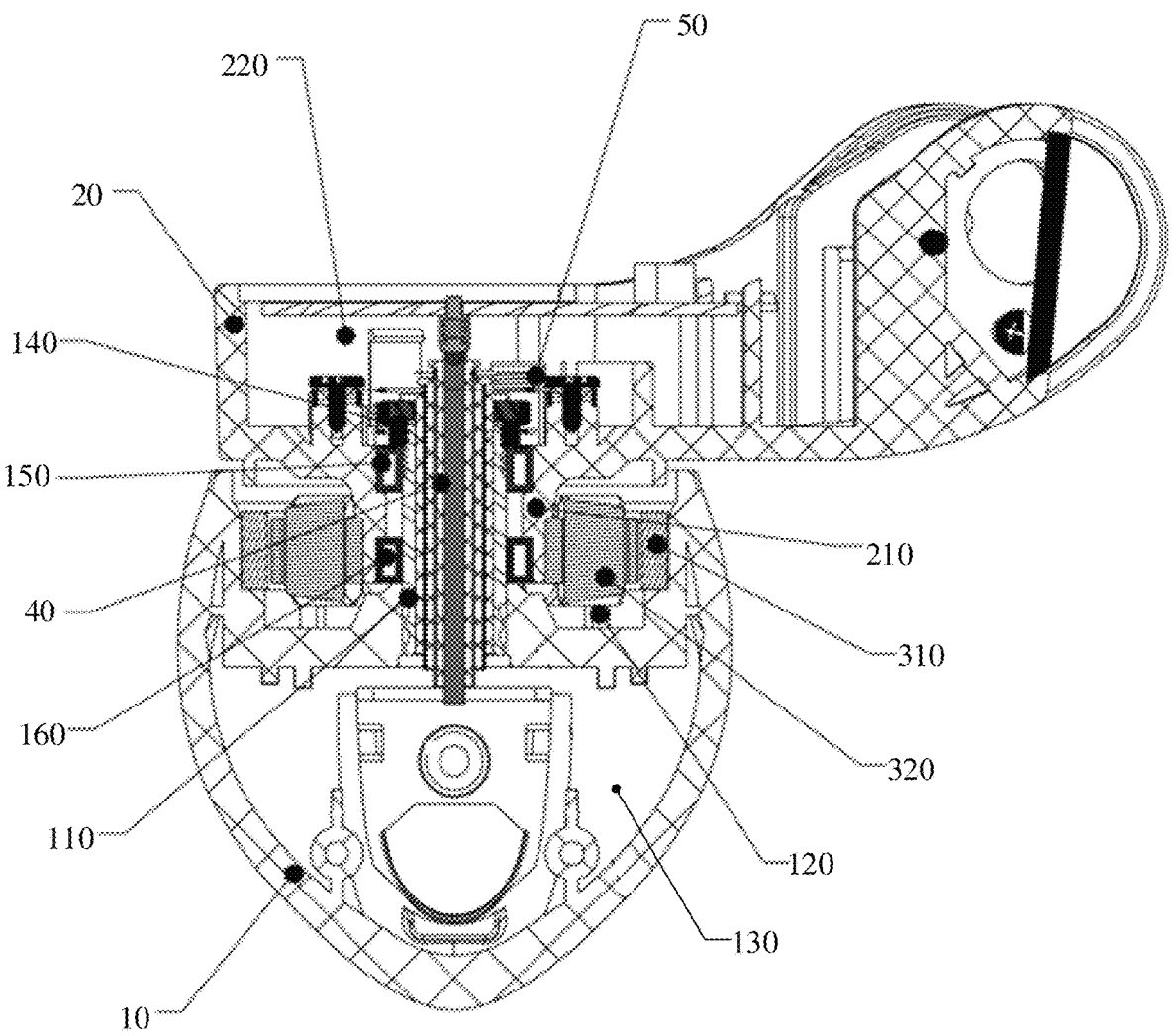
FIG. 3 is a schematic view of the cross-sectional structure of a rotating module provided by an embodiment of the present invention.

As a preferred solution of this embodiment, please refer to FIG. 3. The first housing 10 is also formed with a first accommodation space 120 and an installation space 130. The first stator 310 is located in the first accommodation space 120, and the control assembly is located in the installation space 130. The second housing 20 is also formed with a second accommodation space 220, the conductive assembly 50 is located in the second accommodation space 220, and one end of the conductive post 40 is located in the second accommodation space 220. An end of the first hollow shaft 110 in the second accommodation space 220 is provided with a limiting member 140. A side of the limiting member 140 facing the first housing 10 abuts the second hollow shaft 210. The conductive assembly 50 also includes a fourth conductive terminal 540. The fourth conductive terminal 540 is in contact with the limiting member 140 or the first hollow shaft 110; and the first driving circuit board 60 is connected to the fourth conductive terminal 540.

The first accommodation space 120 formed by the first housing 10 provides an installation environment for the first stator 310; the installation space 130 provides an installation environment for the control assembly; and the second accommodation space 220 formed by the second housing 20 provides an installation environment for the conductive assembly 50. One end of the conductive post 40 is located in the second accommodation space 220. The above arrangement improves the integration of the rotating module of this embodiment. The other end of the conductive post 40 is not specifically limited and can be located in the installation space 130. The connection with the control assembly can be realized through wires. During actual use, the user holds the first housing 10 and the first housing 10 is fixed. Therefore, the conductive post 40 and the control assembly are connected through wires, which will not cause the wires to be twisted or short-circuited.

Referring to FIG. 3, the limiting member 140 is sleeved on one end of the first hollow shaft 110 in the second accommodation space 220, and the side of the limiting member 140 facing the first housing 10 abuts the second hollow shaft 210. The radius of the limiting member 140 is larger than the radius of the second hollow shaft 210. The arrangement of the limiting member 140 limits the axial separation of the first hollow shaft 110 and the second hollow shaft 210, which prevents separation of the first housing 10 and the second housing 20 during the use of the rotating module, thereby improving the connection stability between the first housing 10 and the second housing 20. This improves the working stability of the rotating module. Referring to FIGS. 1 and 3, the first hollow shaft 110 is provided with external threads, and the limiting member 140 is provided with internal threads. The limiting member 140 and the first hollow shaft 110 are connected through threads, which improves the connection stability of the two.

The conductive assembly 50 also includes a fourth conductive terminal 540. The limiting member 140 and the first hollow shaft 110 are made of conductive materials. The first hollow shaft 110 is connected to the control assembly. The fourth conductive terminal 540 is rotationally connected to the limiting member 140. Specifically, the first hollow shaft 110 is connected to the signal module, the signal module can send a second control signal, and the first driving circuit board 60 can control the operation of the first motor assembly 30 according to the above second control signal. For example, the second control signal may be a speed control signal, and the purpose of controlling the rotation speed of the first housing 10 is achieved under the action of the second control signal. The second control signal is not specifically limited here.

In this embodiment, the end of the first conductive terminal 510 is in contact with the first conductive part 410, the end of the second conductive terminal 520 is in contact with the second conductive part 420, the end of the third conductive terminal 530 is in contact with the third conductive part 430, and the end of the fourth conductive terminal 540 is in contact with the limiting member 140.

Through the above contact connection, it can be ensured that the conductive assembly 50 is always in an electrical connection with the conductive post 40 during the rotation of the conductive assembly 50 together with the second housing 20, and the connection relationship is stable. Meanwhile, the contact connection between the conductive assembly 50 and the conductive post 40 is easy to install.

Figure 4:
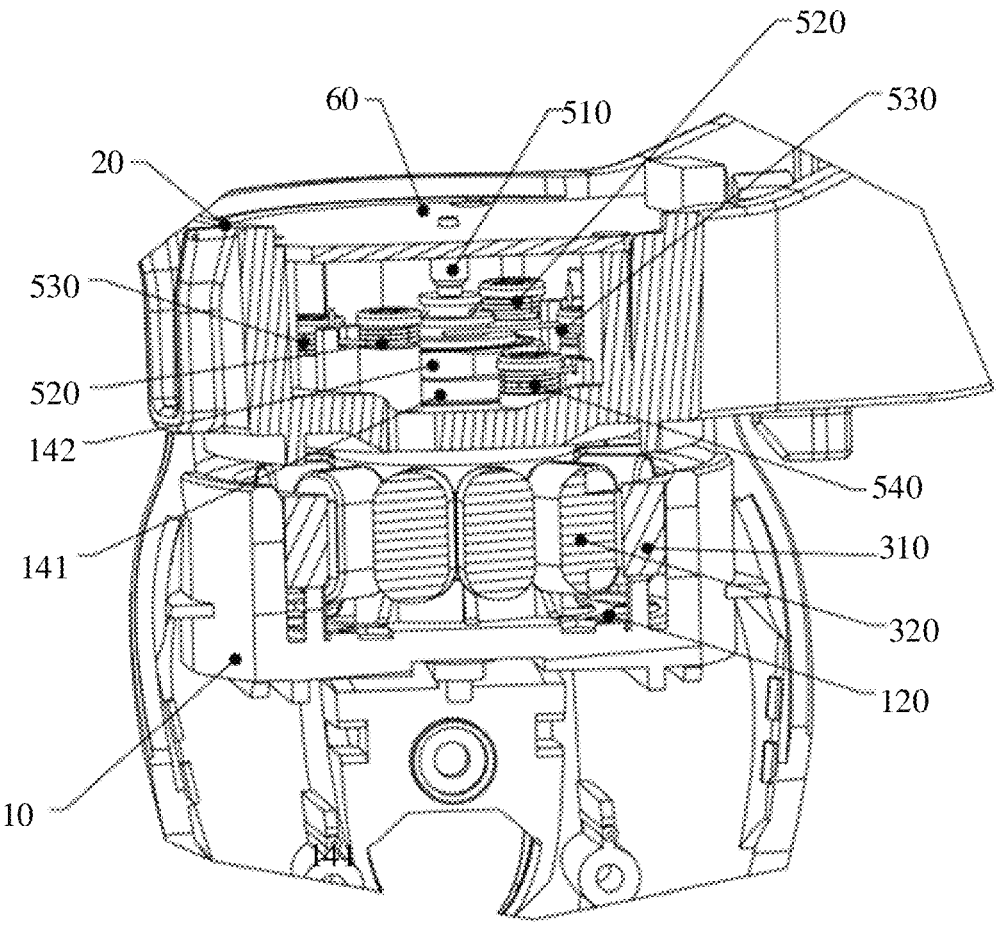
FIG. 4 is a schematic view of the connection of a first housing and a second housing provided by an embodiment of the present invention.

As a preferred solution of this embodiment, please refer to FIG. 4. The second conductive terminal 520 is in elastic contact with the second conductive part 420, the third conductive terminal 530 is in elastic contact with the third conductive part 430, and the fourth conductive terminal 540 is in elastic contact with the limiting member 140.

The above elastic contact connection can strengthen contact strength of the end of the second conductive terminal 520 and the second conductive part 420, the end of the third conductive terminal 530 and the third conductive part 430, and the end of the fourth conductive terminal 540 and the limiting member 140, which improves the connection stability.

In this embodiment, the first conductive terminal 510 may be a conductive spring pin, and the second conductive terminal and the third conductive terminal may be a torsion spring.

As a preferred solution of this embodiment, please refer to FIGS. 6 and 7. The conductive post 40 sequentially includes a first conductive part 410, a first insulating layer 440, a second conductive part 420, the second insulating layer 450, the third conductive part 430 and the third insulating layer 460 which are sleeved one by one along a radial direction from the center toward the periphery. At one end of the conductive post 40 located in the second accommodation space 220, the first insulating layer 440 is formed with a first flange 441 along the radial direction of the conductive post 40, the second insulating layer 450 is formed with a second flange 451 along the radial direction of the conductive post 40, and the third insulating layer 460 is formed with a third flange 461 along the radial direction of the conductive post 40. Along the axis direction of the conductive post 40, the exposed portion of the second conductive part 420 is located between the first flange 441 and the second flange 451, and the exposed portion of the third conductive part 430 is located between the second flange 451 and the third flange 461.

The arrangement of the first insulating layer 440, the second insulating layer 450 and the third insulating layer 460 realizes the insulating connection of the first conductive part 410, the second conductive part 420 and the third conductive part 430. The conductive post 40 is located at one end of the second accommodation space 220. The first flange 441 formed on the first insulating layer 440 and the second flange 451 formed on the second insulating layer 450 cooperate with each other to limit the end of the second conductive terminal 520 and the second conductive part 420, the second flange 451 formed on the second insulating layer 450 and the third flange 461 formed on the third insulating layer 460 cooperate with each other to limit the end of the third conductive terminal 530 and the third conductive part 430, thereby improving the connection stability of the conductive posts 40 and the conductive assembly 50 when the second housing 20 rotates on the first housing 10. It is ensured that the first conductive part 410, the second conductive part 420 and the third conductive part 430 work independently.

As a preferred solution of this embodiment, please refer to FIG. 3. The first hollow shaft 110 is sleeved with a first bearing 150 and a second bearing 160. The first bearing 150 and the second bearing 160 are used to connect the first hollow shaft 110 and the second hollow shaft 210. The limiting member 140 includes a first connecting part 141 and a second connecting part 142 that are connected. The first connecting part 141 is sleeved on the first hollow shaft 110 and is in contact with the inner ring of the first bearing 150. The third flange 461 is provided on the limiting member 140, and the first conductive terminal 510 abuts between the first conductive part 410 and the first driving circuit board 60.

The first bearing 150 and the second bearing 160 are used to assist the rotation of the second housing 20 on the first housing 10. The radius of the second connecting part 142 of the limiting member 140 is larger than the radius of the first connecting part 141, which limits the axial separation of the first hollow shaft 110 and the second hollow shaft 210. Meanwhile, the third flange 461 of the conductive post 40 is provided on the second connecting part 142, the first conductive terminal 510 abuts between the first conductive part 410 and the first driving circuit board 60 and forms the limit for the conductive post 40 along the axial direction of the conductive post 40, which improves the installation stability of the conductive post 40 and further improves the working stability of the rotating module of the embodiment.

As a preferred solution of this embodiment, at least one of the first conductive terminal 510, the second conductive terminal 520, the third conductive terminal 530 and the fourth conductive terminal 540 is provided in multiple quantities.

FIG. 5 shows an example in which one first conductive terminal 510 is provided, two second conductive terminals 520, third conductive terminals 530 and fourth conductive terminals 540 are provided, and the two second conductive terminals 520, the two third conductive terminals 530, and the two fourth conductive terminals 540 are symmetrically arranged in the radial direction of the conductive post 40, which not only increases the electrical connection strength between the conductive post 40 and the conductive assembly 50, but also improves the connection stability.

Please refer to FIG. 5. The above second conductive terminal 520, third conductive terminal 530 and fourth conductive terminal 540 all adopt torsion springs. The second accommodation space 220 also is provided therein with a second mounting part 521, a third mounting part 531 and a fourth mounting part 541. The second conductive terminal 520 is arranged on the second mounting part 521, the third conductive terminal 530 is sleeved on the third mounting part 531, and the fourth conductive terminal 540 is sleeved on the fourth mounting part 541, which provides a stable supporting environment for the second conductive terminal 520, the third conductive terminal 530 and the fourth conductive terminal 540. The number of the above second mounting part 521, third mounting part 531 and fourth mounting part 541 is the same as that of the second conductive terminal 520, the third conductive terminal 530 and the fourth conductive terminal 540. FIG. 5 shows the example in which the number of the second mounting part 521, the third mounting part 531 and the fourth mounting part 541 are two. The second accommodation space 220 is also provided therein with a second fixing part 5211, a third fixing part 5311 and a fourth fixing part 5411. The ends of the second conductive terminal 520, the third conductive terminal 530 and the fourth conductive terminal 540 are respectively fixed on the second fixing part 5211, the third fixing part 5311 and the fourth fixing part 5411 and connected to the first driving circuit board 60. The number of the second fixing part 5211, the third fixing part 5311 and the fourth fixing part 5411 is the same as that of the second conductive terminal 520, the third conductive terminal 530 and the fourth conductive terminal 540. FIG. 5 shows the example in which the number of the second fixing part 5211, the third fixing part 5311 and the fourth fixing part 5411 are two.

The above second mounting part 521, third mounting part 531, fourth mounting part 541, second fixing part 5211, third fixing part 5311 and fourth fixing part 5411 are used to improve the stability of the arrangement of the conductive assembly 50 in the second housing 20, and the second housing 20 can realize the normal operation of the rotating module during the rotation.

Figure 8:
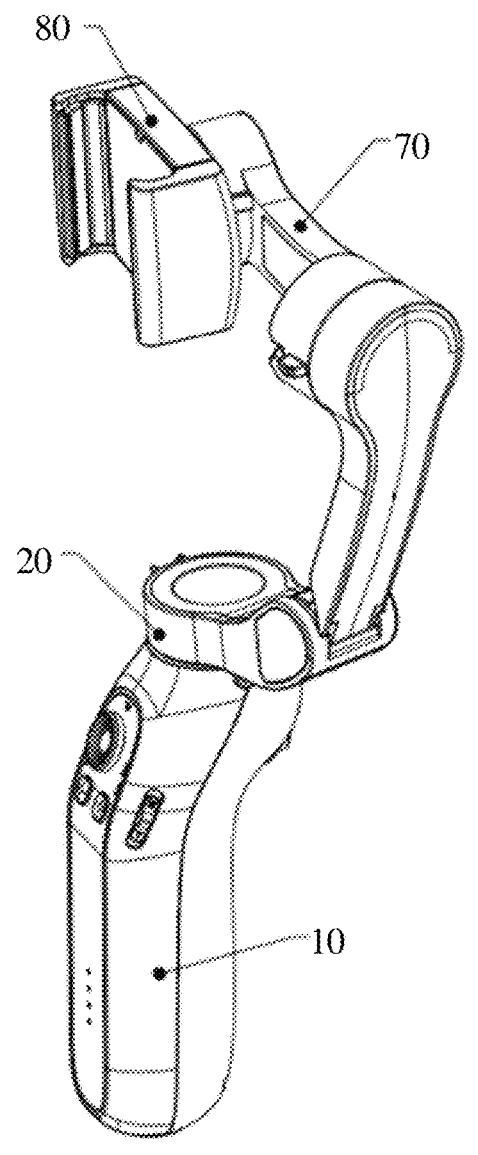
FIG. 8 is a structural schematic view of a rotating module provided by an embodiment of the present invention.

As a preferred solution of this embodiment, referring to FIG. 8, the rotating module also includes: a third housing 70, a second motor assembly (not shown in the drawings) and a second driving circuit board (not shown in the drawings). The third housing 70 is rotationally connected to the second housing 20. The second motor assembly includes a second stator and a second rotor that are rotationally connected, the second stator is fixedly mounted on the second housing 20, and the second rotor is connected to the third housing. The second driving circuit board is provided on the second housing 20 or the third housing 70, and the second driving circuit board is connected to the first driving circuit board 60 and the second rotor.

As a preferred solution of this embodiment, please continue to refer to FIG. 8. The rotating module also includes: a clamping assembly 80, a third motor assembly (not shown in the drawings) and a third driving circuit board (not shown in the drawings). The clamping assembly 80 is rotationally connected to the third housing 70. The third motor assembly includes a third stator and a third rotor that are rotationally connected, the third stator is fixedly mounted on the third housing 70, and the third rotor is connected to the clamping assembly 80. The third driving circuit board is provided on the third housing 70 or the clamping assembly 80, and the third driving circuit board is connected to the second driving circuit board and the third rotor.

In the rotating module of this embodiment, the clamping assembly 80 is used to clamp a photographing equipment (not shown in the drawings), such as a mobile phone. The rotation of the second housing 20 on the first housing 10 can adjust the orientation of the photographing equipment along the circumference of the first housing 10, so that the user can adjust it according to the shooting needs. The third housing 70 can rotate on the second housing 20 to adjust the pitch angle of the photographing equipment to assist shooting. The clamping assembly 80 can rotate on the third housing 70 to adjust the swing angle of the photographing equipment along the length direction of the first housing 10.

The second driving circuit board can drive the second motor assembly to work according to the third control signal sent by the control module, so that the second rotor of the second motor assembly rotates on the second stator, achieving the purpose of rotation of the third housing 70 on the second housing 20. The third driving circuit board can drive the third motor assembly to work according to the fourth control signal sent by the control module, so that the third rotor of the third motor assembly rotates on the third stator, achieving the purpose of rotation of the clamping assembly 80 on the third housing 70.

The connection method of the second housing 20 and the third housing 70 and the connection method of the third housing 70 and the clamping assembly 80 in this embodiment can be the same as the connection method of the first housing 10 and the second housing 20.

The control assembly, the second driving circuit board, and the third driving circuit board of this embodiment are all implemented using existing technologies, and will not be described in detail here.

Figure 9:
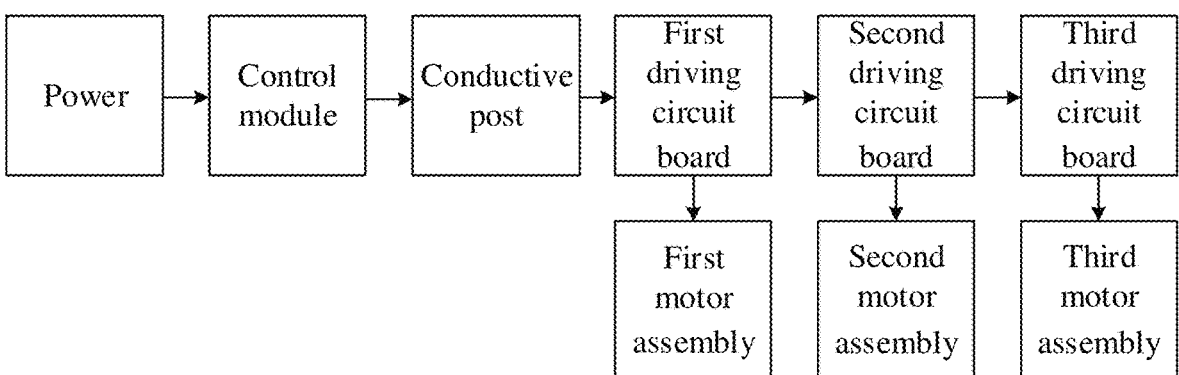
FIG. 9 is a view of an electrical connection module of a gimbal provided by an embodiment of the present invention.

FIG. 9 shows the overall module diagram of the battery, control assembly, conductive post 40, first driving circuit board 60, second driving circuit board, third driving circuit board, first motor assembly 30, second motor assembly and third motor assembly of this embodiment, in which the battery powers the rotating module of this embodiment.

An embodiment of the present application also discloses a gimble, including the above rotating module. The gimbal includes the same structure and beneficial effects as the rotating module in the above embodiments. The structure and beneficial effects of the rotating module have been described in detail in the foregoing embodiments and will not be described again here.

It should be understood that the above embodiments are only used to illustrate the technical solutions of the present invention, but not to limit them. For those skilled in the art, the technical solutions disclosed in the above embodiments can be modified, or equivalent substitutions of some of the technical features are made; and all these modifications and substitutions shall fall within the protection scope of the appended claims of the present invention.

What is claimed is:

1. A rotating module, characterized by comprising:
a first housing (10), a first hollow shaft (110) being provided at an end of the first housing (10);
a second housing (20), a second hollow shaft (210) being provided at an end of the second housing (20) close to the first housing (10), the first hollow shaft (110) being inserted into the second hollow shaft (210), and the first hollow shaft (110) and the second hollow shaft (210) being rotationally connected;
a first motor assembly (30) comprising a first stator (310) and a first rotor (320), the first stator (310) being fixedly provided in the first housing (10), and the first rotor (320) being fixedly sleeved on the second hollow shaft (210);
a conductive post (40) inserted into the first hollow shaft (110), the conductive post (40) comprising a first conductive part (410) and a second conductive part (420) that are insulated from each other;
a conductive assembly (50) comprising a first conductive terminal (510) and a second conductive terminal (520) provided in the second housing (20), the first conductive terminal (510) being in contact with the first conductive part (410), and the second conductive terminal (520) being in contact with the second conductive part (420);
a first driving circuit board (60) provided in the second housing (20) and connected to the first conductive terminal (510) and the second conductive terminal (520) respectively, the first driving circuit board (60) being further connected to the first rotor (320); and
a control assembly provided in the first housing (10) and connected to the first conductive part (410) and the second conductive part (420) respectively.

2. The rotating module according to claim 1, characterized in that the conductive post (40) further comprises a third conductive part (430);
the conductive assembly (50) further comprises a third conductive terminal (530) provided in the second housing (20);
the third conductive part (430) is insulated from the first conductive part (410) and the second conductive part (420) respectively;
an end of the third conductive terminal (530) is in contact with the third conductive part (430), and another end is connected to the first driving circuit board (60); and
the third conductive part (430) is further connected to the control assembly.

3. The rotating module according to claim 2, characterized in that
the first housing (10) is further formed with a first accommodation space (120) and an installation space (130), the first stator (310) is located in the first accommodation space (120), and the control assembly is located in the installation space (130);

the second housing (20) is further formed with a second accommodation space (220), the conductive assembly (50) is located in the second accommodation space (220), and an end of the conductive post (40) is located in the second accommodation space (220);
a limiting member (140) is provided on an end of the first hollow shaft (110) located in the second accommodation space (220), and a side of the limiting member (140) facing the first housing (10) abuts the second hollow shaft (210);
the conductive assembly (50) further comprises a fourth conductive terminal (540), the fourth conductive terminal (540) is in contact with the limiting member (140) or the first hollow shaft (110), the first driving circuit board (60) is connected to the fourth conductive terminal (540), and the first hollow shaft (110) is further connected to the control assembly; and
wherein the limiting member (140) and the first hollow shaft (110) are made of a conductive material, and the third conductive part (430) is insulated from the limiting member (140) and the first hollow shaft (110) respectively.

4. The rotating module according to claim 3, characterized in that
the second conductive terminal (520) is in elastic contact with the second conductive part (420), the third conductive terminal (530) is in elastic contact with the third conductive part (430) is in elastic contact, and the fourth conductive terminal (540) is in elastic contact with the limiting member (140).

5. The rotating module according to claim 3, characterized in that
the conductive post (40) sequentially comprises the first conductive part (410), a first insulating layer (440), the second conductive part (420), a second insulating layer (450), the third conductive part (430) and a third insulating layer (460) which are sleeved one by one along a radial direction from a center toward a periphery;
at an end of the conductive post (40) located in the second accommodation space (220), the first insulating layer (440) is formed with a first flange (441) along a radial direction of the conductive post (40), and the second insulating layer (450) is formed with a second flange (451) along the radial direction of the conductive post (40), and the third insulating layer (460) is formed with a third flange (461) along the radial direction of the conductive post (40);
along an axial direction of the conductive post (40), an exposed portion of the second conductive part (420) is located between the first flange (441) and the second flange (451), and an exposed portion of the third conductive part (430) is located between the second flange (451) and the third flange (461).

6. The rotating module according to claim 5, characterized in that
the first hollow shaft (110) is sleeved with a first bearing (150) and a second bearing (160), and the first bearing (150) and the second bearing (160) are used to connect the first hollow shaft (110) and the second hollow shaft (210);
the limiting member (140) comprises a first connecting part (141) and a second connecting part (142) that are connected, and the first connecting part (141) is sleeved on the first hollow shaft (110) and in contact with an inner ring of the first bearing (150), the third flange (461) is provided on the limiting member (140), and the first conductive terminal (510) abuts between the first conductive part (410) and the first driving circuit board (60).

7. The rotating module according to claim 3, characterized in that at least one of the first conductive terminal (510), the second conductive terminal (520), the third conductive terminal (530) and the fourth conductive terminal (540) is provided in multiple quantities.

8. The rotating module according to claim 1, characterized in that, the rotating module further comprises:

a third housing (70) rotationally connected to the second housing (20);

a second motor assembly comprising a second stator and a second rotor that are rotationally connected, the second stator is fixedly provided on the second housing (20), and the second rotor is connected to the third housing (70);

a second driving circuit board provided on the second housing (20) or the third housing (70), the second driving circuit board is connected to the first driving circuit board (60) and the second rotor.

9. The rotating module according to claim 8, characterized in that the rotating module further comprises:

a clamping assembly (80) rotationally connected to the third housing (70);

a third motor assembly comprising a third stator and a third rotor that are rotationally connected, the third stator is fixedly provided on the third housing (70), and the third rotor is connected to the clamping assembly (80);

a third driving circuit board provided on the third housing (70) or the clamping assembly (80), the third driving circuit board is connected to the second driving circuit board and the third rotor.

10. A gimbal, characterized by comprising the rotating module according to claim 1.

11. The gimbal according to claim 10, characterized in that the conductive post (40) further comprises a third conductive part (430);

the conductive assembly (50) further comprises a third conductive terminal (530) provided in the second housing (20);

the third conductive part (430) is insulated from the first conductive part (410) and the second conductive part (420) respectively;

an end of the third conductive terminal (530) is in contact with the third conductive part (430), and another end is connected to the first driving circuit board (60); and the third conductive part (430) is further connected to the control assembly.

12. The gimbal according to claim 11, characterized in that the first housing (10) is further formed with a first accommodation space (120) and an installation space (130), the first stator (310) is located in the first accommodation space (120), and the control assembly is located in the installation space (130);

the second housing (20) is further formed with a second accommodation space (220), the conductive assembly (50) is located in the second accommodation space (220), and an end of the conductive post (40) is located in the second accommodation space (220);

a limiting member (140) is provided on an end of the first hollow shaft (110) located in the second accommodation space (220), and a side of the limiting member (140) facing the first housing (10) abuts the second hollow shaft (210);

the conductive assembly (50) further comprises a fourth conductive terminal (540), the fourth conductive terminal (540) is in contact with the limiting member (140) or the first hollow shaft (110), the first driving circuit board (60) is connected to the fourth conductive terminal (540), and the first hollow shaft (110) is further connected to the control assembly; and wherein the limiting member (140) and the first hollow shaft (110) are made of a conductive material, and the third conductive part (430) is insulated from the limiting member (140) and the first hollow shaft (110) respectively.

13. The gimbal according to claim 12, characterized in that the second conductive terminal (520) is in elastic contact with the second conductive part (420), the third conductive terminal (530) is in elastic contact with the third conductive part (430) is in elastic contact, and the fourth conductive terminal (540) is in elastic contact with the limiting member (140).

14. The gimbal according to claim 12, characterized in that the conductive post (40) sequentially comprises the first conductive part (410), a first insulating layer (440), the second conductive part (420), a second insulating layer (450), the third conductive part (430) and a third insulating layer (460) which are sleeved one by one along a radial direction from a center toward a periphery;

at an end of the conductive post (40) located in the second accommodation space (220), the first insulating layer (440) is formed with a first flange (441) along a radial direction of the conductive post (40), and the second insulating layer (450) is formed with a second flange (451) along the radial direction of the conductive post (40), and the third insulating layer (460) is formed with a third flange (461) along the radial direction of the conductive post (40);

along an axial direction of the conductive post (40), an exposed portion of the second conductive part (420) is located between the first flange (441) and the second flange (451), and an exposed portion of the third conductive part (430) is located between the second flange (451) and the third flange (461).

15. The gimbal according to claim 14, characterized in that the first hollow shaft (110) is sleeved with a first bearing (150) and a second bearing (160), and the first bearing (150) and the second bearing (160) are used to connect the first hollow shaft (110) and the second hollow shaft (210);

the limiting member (140) comprises a first connecting part (141) and a second connecting part (142) that are connected, and the first connecting part (141) is sleeved on the first hollow shaft (110) and in contact with an inner ring of the first bearing (150), the third flange (461) is provided on the limiting member (140), and the first conductive terminal (510) abuts between the first conductive part (410) and the first driving circuit board (60).

16. The gimbal according to claim 12, characterized in that

US 12,693,582 B2

15 at least one of the first conductive terminal (510), the second conductive terminal (520), the third conductive terminal (530) and the fourth conductive terminal (540) is provided in multiple quantities.

17. The gimbal according to claim 10, characterized in that, the rotating module further comprises:

a third housing (70) rotationally connected to the second housing (20);

a second motor assembly comprising a second stator and a second rotor that are rotationally connected, the second stator is fixedly provided on the second housing (20), and the second rotor is connected to the third housing (70);

a second driving circuit board provided on the second housing (20) or the third housing (70), the second driving circuit board is connected to the first driving circuit board (60) and the second rotor.

18. The gimbal according to claim 17, characterized in that the rotating module further comprises:

a clamping assembly (80) rotationally connected to the third housing (70);

a third motor assembly comprising a third stator and a third rotor that are rotationally connected, the third stator is fixedly provided on the third housing (70), and the third rotor is connected to the clamping assembly (80);

a third driving circuit board provided on the third housing (70) or the clamping assembly (80), the third driving circuit board is connected to the second driving circuit board and the third rotor.

\* \* \* \* \*